(12) United States Patent
Wakazono

(10) Patent No.: US 7,057,827 B2
(45) Date of Patent: Jun. 6, 2006

(54) ZOOM LENS AND PICKUP SYSTEM

(75) Inventor: Tsuyoshi Wakazono, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/092,305

(22) Filed: Mar. 29, 2005

(65) Prior Publication Data
US 2005/0219709 A1  Oct. 6, 2005

(30) Foreign Application Priority Data
Mar. 31, 2004  (JP)  ............... 2004-108589

(51) Int. Cl.
*G02B 15/14* (2006.01)

(52) U.S. Cl. ............. 359/684; 359/688; 359/674; 359/675

(58) Field of Classification Search ......... 359/684, 359/674, 675
See application file for complete search history.

(56) References Cited

U.S. PATENT DOCUMENTS 5,442,486 A   8/1995  Sato
5,771,123 A   6/1998  Hamano et al.

FOREIGN PATENT DOCUMENTS

| EP | 1092999 A3 | 9/2003 |
| JP | 10-90599 A | 4/1998 |

*Primary Examiner*—Scott J. Sugarman
(74) *Attorney, Agent, or Firm*—Canon U.S.A. Inc IP Division

(57) ABSTRACT

A zoom lens includes first to fourth lens units arranged in order from an object, respectively. The first lens unit is fixed during power-varying and has positive optical power. The second lens unit is movable during power-varying. The third lens unit is movable so as to compensate image-plane fluctuation in accordance with the power-varying. The fourth lens unit is fixed during the power-varying and has positive optical power. The first lens unit includes a first lens subunit having positive optical power, and a second lens subunit having negative optical power, arranged in order from the object, respectively. One of the first and second lens subunits moves upon focus adjustment. Further, the following conditions are satisfied:

$$-2.5 < f1b/f1a < -0.6 \text{ and } 0.2 < f1/fT < 0.8.$$

Wherein f1, f1a, f1b, and fT respectively represent the focal lengths of the first lens unit, the first lens subunit, the second lens subunit, and the overall system of the zoom lens at its telephoto end.

8 Claims, 14 Drawing Sheets

ZOOM LENS AND PICKUP SYSTEM

BACKGROUND OF THE INVENTION

Field of the Invention

The present invention relates to a zoom lens incorporated in pickup apparatuses such as a digital still camera, a TV camera, and a video camera.

Description of the Related Art

Related Background Art

The zoom lens as mentioned above has a four unit structure in which a first lens unit having a positive refractive power for focus adjustment, a second lens unit having a negative refractive power for power-varying, a third lens unit having a positive or negative refractive power for compensating image-plane fluctuation in accordance with the power-varying, and a fourth lens unit having a positive refractive power for forming an image are arranged from the order of an object, or a three unit structure in which the third lens unit has a function of compensating image-plane fluctuation and forming an image.

Of such zoom lenses, in particular, a telescopic-type zoom lenses, each having an angle of view (2ω) not greater than 2.0 degrees at its telephoto end and a variable power ratio of about 1.5 to 3, are disclosed in U.S. Pat. No. 5,442,486, Japanese Patent Laid-Open No. 10-90599, and European Patent Application No. 1092999. Also, a super-telescopic-type zoom lens for use in a TV camera, having an angle of view (2ω) not greater than 2.0 degrees at the telephoto end and a variable power ratio of about 40 is disclosed.

When an object such as an animal or a bird is picked up outdoors at a long range so as to be provided for a TV nature program or the like, a zoom lens having a high variable power ratio (for example, having a large magnification not smaller than 5 and an angle of view not greater than 2 degrees (that is, having a focal length not shorter than 330 mm when converted to the corresponding one of a ⅔ type CCD) and a high optical performance is desired. Also, in such a pickup activity, since a camera is often used while being shouldered, a more compact and lighter-weight zoom lens easy to be taken anywhere is desired.

With respect to a zoom lens having the four unit structure, the following expressions are satisfied:

Expressions 1

$$fw = f1 \times \beta 2w \times \beta 3w \times \beta 4 \quad (a\text{-}1)$$

$$fT = f1 \times \beta 2T \times \beta 3T \times \beta 4 \quad (a\text{-}2)$$

$$Z = fT/fw = \beta 2T/\beta 2w \times \beta 3T/\beta 3w \quad (a\text{-}3)$$

Wherein, fw and fT respectively represent the focal lengths of the overall system of the zoom lens at its wide angle and telephoto ends, f1 represents the focal length of the first lens unit, Z represents the variable ratio of the zoom lens, βiw and βiT respectively represent the image-forming magnifications of an i-th lens unit at its wide angle and telephoto ends, and β4 represents the image-forming magnification of the fourth lens unit, which is constant during power-varying since the fourth lens unit is fixed during the power-varying.

In order to achieve a telescopic feature, it is sufficient to make larger the focal length f1 of the first lens unit or the image-forming magnifications β2T, β3T, and β4 of the second, third, and fourth lens units at the telephoto end according to the expression (a-2).

However, when β2T, β3T, and β4 are made greater, spherical and longitudinal chromatic aberrations generated in the first lens unit increase in proportion to the square of each image-forming magnification. Hence, it is better to make the focal length f1 of the first lens unit larger, especially from the viewpoint of an optical performance at the telephoto end. Meanwhile, the expressions (a-1) to (a-3) can also be applied to a zoom lens having the three unit structure except for β4.

FIG. 18 is a conceptual view of a zoom lens having the four unit structure, illustrating a first lens unit L1 fixed during power-varying and having a positive refractive power and a second lens unit L2 moving toward an image plane upon the power-varying. In the figure, a reference character N represents the image point of the first lens unit L1, that is, the apparent object point of the second lens unit L2; f1 and f2 respectively represent the focal lengths of the first and second lens units L1 and L2; reference characters e1w and e1T respectively represent principal-point intervals between the first and second lens units L1 and L2 at the wide angle and telephoto ends of the zoom lens; and a reference character mv represents a moving amount of the second lens unit L2 from the wide angle to telephoto ends of the zoom lens.

In order to achieve a larger magnification, it is needed to make the ratio of the image-forming magnifications of the second and third lens units at the wide angle and telephoto ends of the zoom lens greater according to the expression (a-3). In particular, when attention is focused on a change of the image-forming magnifications β2 of the second lens unit L2 largely affecting the variable ratio, the following expressions are brought about:

Expressions 2

$$\beta 2w = \frac{f2}{f1 - e1w + f2} \quad (b\text{-}1)$$

$$\beta 2T = \frac{f2}{f1 - e1T + f2} = \frac{f2}{f1 - e1w - mv + f2} \quad (b\text{-}2)$$

$$\frac{\beta 2T}{\beta 2w} = \frac{f1 - e1w + f2}{f1 - e1w - mv + f2} \quad (b\text{-}3)$$

According to the expression (b-3), the conditions for achieving a larger magnification are given as below, (1) The focal lengths f1 and f2 of the first and second lens units L1 and L2 are small;

(2) the moving amount mv of the second lens L2 is large;

(3) the principal-point interval e1w between the first and second lens units L1 and L2 at the wide angle end is large.

Unfortunately, making smaller the focal length f1 of the first lens unit L1 requires the image-forming magnifications of the second and following lens units to be larger, thereby increasing spherical and longitudinal chromatic aberrations and deteriorating the optical performance. Also, making smaller the focal length f2 of second lens unit L2 increases fluctuation of various aberrations in accordance with the power-varying, thereby deteriorating optical performance.

In addition, making larger the moving amount mv of the second lens unit L2 requires a wider space for the second lens unit L2 to move, thereby resulting in increase in the overall length of the zoom lens. Further, although making larger the principal-point interval e1w between the first and second lens units L1 and L2 is advantageous for a greater magnification, a large space is generated at the wide angle end between the first and second lens units L1 and L2, thereby resulting in increases in the overall length of the zoom lens and the diameter of a front cell lens unit of the zoom lens.

Accordingly, in order to achieve a compact and lightweight zoom lens having a large magnification and a high performance, it is important to set parameters including the foregoing f1, f2, mv, and e1w in appropriate ranges in accordance with the specifications of the lens. Also, since the principal-point interval e1w between the first and second lens units L1 and L2 largely affects achievement of a greater magnification, the overall length of the lens, and the diameter of the front cell lens unit, it is especially essential to appropriately set the principal point of the first lens unit L1.

In the zoom lens disclosed in U.S. Pat. No. 5,442,486, the focal length f1 of the first lens unit L1 is about 600 mm to 900 mm, the principal-point interval e1w between the first and second lens units L1 and L2 is about 450 to 700 mm, and the moving amount mv of the second lens unit L2 is about 10 to 15 mm. Also, in the zoom lens disclosed in Japanese Patent Laid-Open No. 10-90599, the focal length f1 of the first lens unit L1 is about 235 mm, the principal-point interval e1w between the first and second lens units L1 and L2 is about 110 mm, and the moving amount mv of the second lens unit L2 is about 45. Thus, in both zoom lenses, since mv is smaller than (f1−e1w) according to the expression (b-3), the variable ratio of the zoom lens is as small as about 1.5 to 3, thereby failing to satisfy the requirement of a greater magnification.

In the zoom lens disclosed in EP1092999, although the variable ratio of the zoom lens is not smaller than 40, the moving amount mv of the second lens unit L2 is as large as about 100 to 120 mm, thereby resulting in a larger-sized zoom lens having the overall length of about 400 mm and the diameter of about 180 mm of the front cell lens unit.

SUMMARY OF THE INVENTION

The present invention is directed to a compact and lightweight zoom lens having a large magnification and a high optical performance, achieved by appropriately setting an optical arrangement of a first lens unit. The present invention is also directed to a pickup system incorporating the zoom lens.

In accordance with one aspect of the present invention, a zoom lens includes first, second, third and fourth lens units arranged in order from an object, respectively. The first lens unit is fixed during power-varying and has positive optical power. The second lens unit is movable during power-varying. The third lens unit is movable so as to compensate image-plane fluctuation in accordance with the power-varying. The fourth lens unit is fixed during the power-varying and has positive optical power. The first lens unit includes a first lens subunit having positive optical power and a second lens subunit having negative optical power, arranged in order from the object. One of the first and second subunits moves upon focus adjustment. Further, the following conditions are satisfied:

$$-2.5 < f1b/f1a < -0.6 \text{ and}$$

$$0.2 < f1/fT < 0.8.$$

Wherein f1, f1a, f1b, and fT respectively represent the focal lengths of the first lens unit, the first lens subunit, the second lens subunit, and the overall system of the zoom lens at its telephoto end.

Further features and advantages of the present invention will become apparent from the following description of exemplary embodiments with reference to the attached drawings.

DESCRIPTION OF THE EMBODIMENTS

Figure 1:
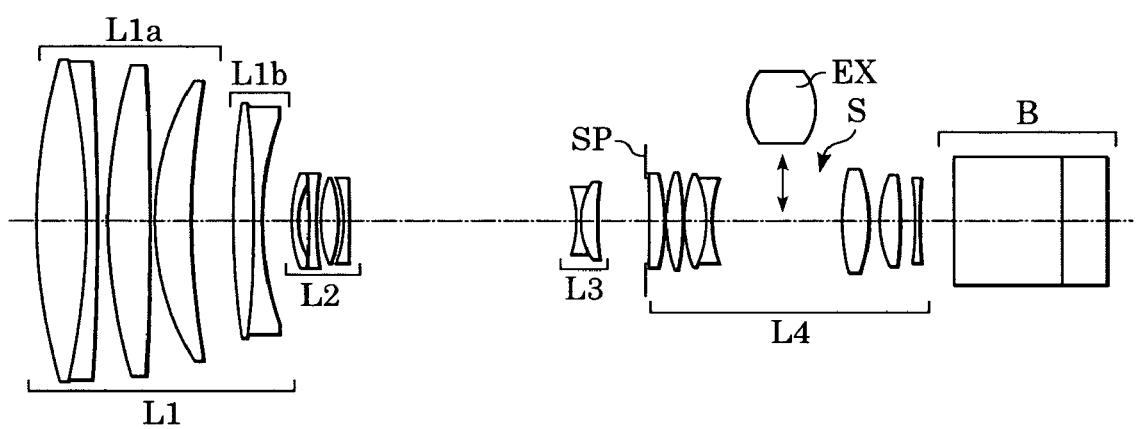
FIG. 1 is a sectional view of a zoom lens according to a first embodiment (Numerical example 1) of the present invention at its wide angle end.

Embodiments of the present invention will be described with reference to the attached drawings. Common elements of zoom lenses according to first to fourth embodiments (numerical examples 1 to 4) shown in FIGS. 1, 5, 9, and 13, which will be described later, will be first described. Each of the zoom lenses according to the first to fourth embodiments is a large-aperture, large-magnification, high-performance telephoto zoom lens, having an angle of view (2ω) not greater than 2.0 degrees, a variable power ratio of about 5 or greater, and an aperture ratio not greater than 3.0 at its wide angle end.

The zoom lens according to each embodiment includes, in order from an object (from the left side in the figure), a first lens unit L1 fixed during power-varying and having a positive refractive power in terms of an optical power (the reciprocal of focal length), a second lens unit L2 movable for power-varying, an aperture SP, a third lens unit L3 movable for compensating fluctuation of an image plane in accordance with the power-varying, and a fourth lens unit L4 fixed during the power-varying and having a positive refractive power.

The first lens unit L1 includes a 1a-th lens subunit (a first lens subunit) L1a having a positive refractive power and a 1b-th lens subunit (a second lens subunit) L1b having a negative refractive power in order from the object. One of the 1a-th and 1b-th lens subunits L1a and L1b moves upon focus adjustment.

Thus, the zoom lens satisfies the following conditions:

$$-2.5 < f1b/f1a < -0.6 \quad (1) \text{ and}$$

$$0.2 < f1/fT < 0.8 \quad (2),$$

Wherein f1, f1a, f1b, and fT respectively represent the focal lengths of the first lens unit L1, the first lens subunit L1a, the second lens subunit L1b, and the overall system of the zoom lens at its telephoto end.

Further, the following conditions are also satisfied:

$$30 < fT < Ld \quad (3) \text{ and}$$

$$5 < Z \quad (4),$$

Wherein Ld and Z respectively represent the diagonal length of an effective picture plane formed by the zoom lens and the zoom ratio of the zoom lens.

Furthermore, the following condition is additionally satisfied:

$$0.3 < K < 0.95 \quad (5),$$

Wherein K represents the ratio of the distance from the first lens subunit to the rear focal position of the first lens unit to the focal length of the first lens unit.

When the first lens subunit L1a includes at least two positive lens elements and at least one negative lens element, the following condition is satisfied:

$$\nu_{ap} - \nu_{an} > 30 \quad (6),$$

Wherein $\nu_{ap}$ and $\nu_{an}$ respectively represent the averages of the Abbe constants of the positive and negative lens elements included in the first lens subunit.

When the 1b-th lens subunit L1b is made up by at least one positive lens element and at least one negative lens element, the following condition is satisfied:

$$\nu_{bn} - \nu_{bp} > 5 \quad (7),$$

Wherein $\nu_{bp}$ and $\nu_{bn}$ respectively represent the averages of the Abbe constants of the positive and negative lens elements included in the second lens subunit.

Figure 17:
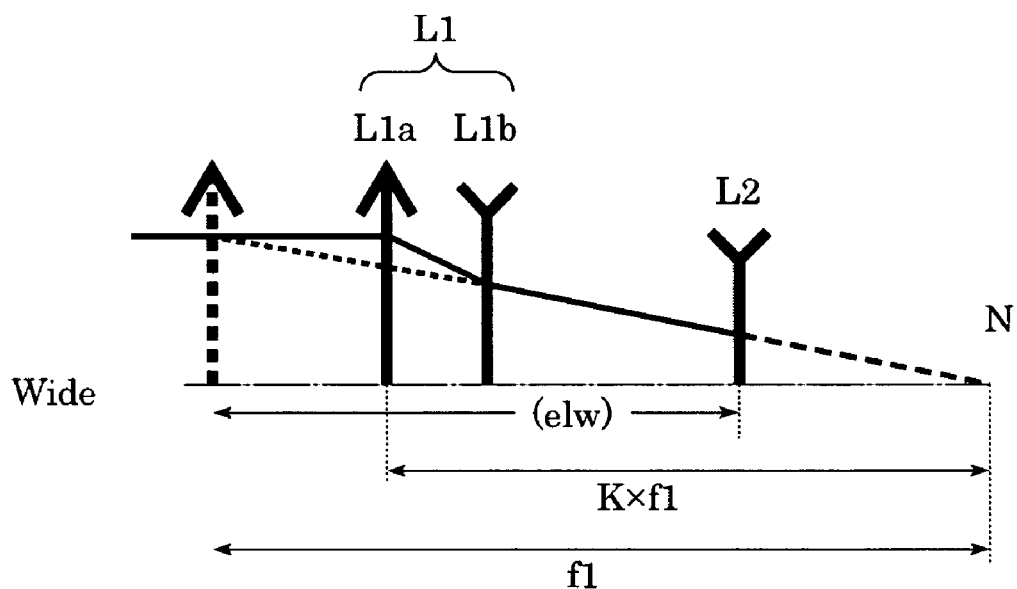
FIG. 17 is a schematic view of the basic structure of a first lens unit of the zoom lens at its wide angle end, according to any one of the embodiments.

The conditional expressions (1) to (4) define the conditions for achieving reduction in size and weight, a larger magnification and a higher performance of the zoom lens. Referring now to FIG. 17, the structure and the arrangement of the first lens unit L1 of the zoom lens of each embodiment at its wide angle end will be described.

Figure 18:
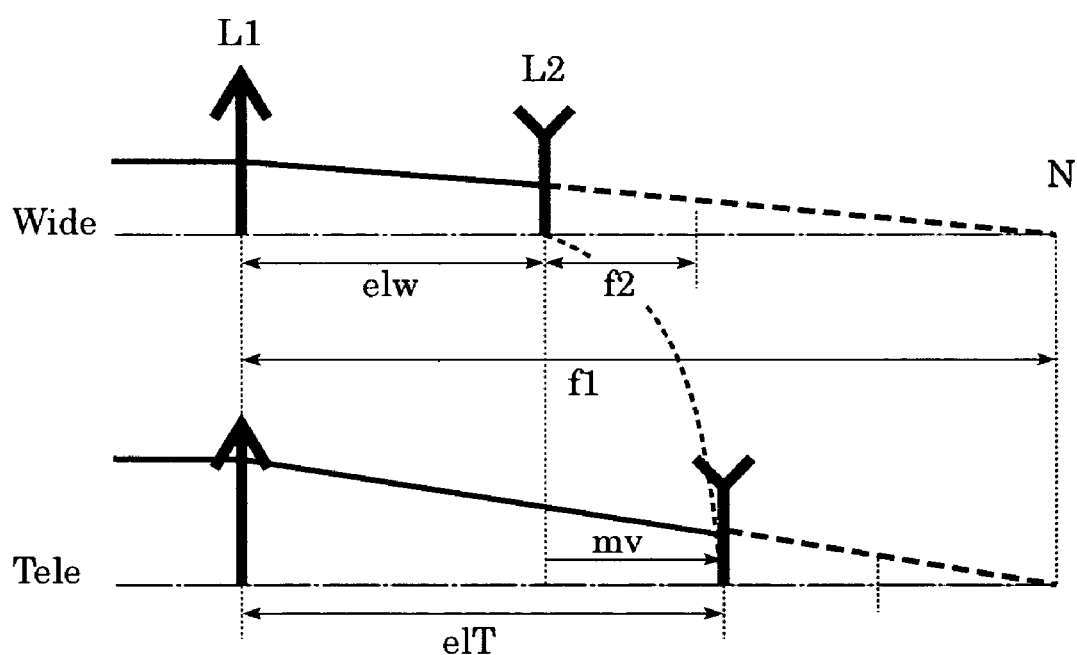
FIG. 18 is a schematic view of first and second lens units of a known zoom lens having a four unit structure.

Reference characters L1 to L4 and L1a and L1b respectively represent those as described above. Meanwhile, the second lens unit L2, which will be described below, has a negative refractive power. A reference character N represents the image point of the first lens unit L1, that is, the apparent object point of the second lens unit L2. When the composite focal length of the 1a-th lens subunit L1a and the 1b-th lens subunit L1b (that is, the focal length of the first lens unit L1) is represented by f1, the arrangement of the zoom lens shown in FIG. 17 is equivalent to the paraxial arrangement of the zoom lens shown in FIG. 18.

As shown in FIG. 17, by dividing the first lens unit L1 into the 1a-th lens subunit L1a having a positive refractive power and the 1b-th lens subunit L1b having a negative refractive power so as to provide a so-called telephoto structure, the telephoto ratio of the first lens unit L1, that is, the ratio of the distance from the 1a-th lens subunit L1a to the rear focal point of the first lens unit L1 to the focal length of the first lens unit L1 can be reduced. With this structure, even when the principal-point interval e1w between the first and second lens units L1 and L2 is made wider so as to achieve a large magnification, useless dead space is reduced, thereby achieving both a large magnification and a reduction in size and weight of zoom lens at the same time.

When the focal lengths of the 1a-th and 1b-th lens subunits L1a and L1b are respectively represented by f1a and f1b; the principal-point interval between the 1a-th and 1b-th lens subunits L1a and L1b is represented by e1'; the image-forming magnification of the 1b-th lens subunit L1b is represented by β1b; and the telephoto ratio of the first lens unit L1 is represented by K, the following expressions are satisfied:

Expressions 3

$$f1a = \frac{f1}{\beta 1b} \quad (c\text{-}1)$$

$$f1b = \frac{(f1a - e1') \times \beta 1b}{1 - \beta 1b} \quad (c\text{-}2)$$

$$K = \frac{e1' + (f1a - e1') \times \beta 1b}{f1} \quad (c\text{-}3)$$

By appropriately setting the focal lengths f1a and f1b of the 1a-th and 1b-th lens subunits L1a and L1b so as to make the telephoto ratio K of the first lens unit L1 smaller, the size and weight of the zoom lens can be reduced. Also, since the first lens unit L1 is divided into the 1a-th and 1b-th lens subunits L1a and L1b, the degree of freedom of aberration compensation is increased, thereby achieving a higher performance of the zoom lens. In addition, since one of the 1a-th and 1b-th lens subunits L1a and L1b is moved for focus adjustment, the weight of a focus lens unit is reduced, thereby reducing the drive force of the zoom lens.

The conditional expression (1) defines the ratio of the focal length of the 1a-th lens subunit L1a to that of the 1b-th lens subunit L1b. When the ratio is smaller than the lower limit of the conditional expression (1), the telephoto ratio K of the first lens unit L1 is great, and reduction in size of the zoom lens is hence not achieved; accordingly, lying out of the lower limit is undesirable.

When the ratio is greater than the upper limit of the conditional expression (1), the telephoto ratio K of the first lens unit L1 is small and reduction in size of the zoom lens is therefore achieved. Whereas, when the telephoto ratio K is small, the focal lengths of the 1a-th and 1b-th lens subunits L1a and L1b are small according to the expressions (c-2) and (c-3). Hence, both subunit lenses have excessive refractive powers, thereby generating high-order aberrations and making them difficult to be compensated. Especially, a longitudinal chromatic aberration and high-order spherical aberrations on the telephoto side are great and difficult to be compensated by the other lens units. Also, since divergence of the zoom lens is excessively strong at the 1b-th lens subunit L1b, an off-axial light beam is incident on the 1a-th lens subunit L1a at a high position. Hence, the 1a-th lens subunit L1a is needed to have a large diameter in order to keep a necessary amount of ambient light.

When the zoom lens is focused by moving the 1a-th lens subunit L1a, since the 1a-th lens subunit L1a is delivered toward an object for focus adjustment within a limited distance, the 1a-th lens subunit L1a is needed to have a larger effective diameter, whereby this structure is undesirable.

Whereas, when the zoom lens is focused by moving the 1b-th lens subunit L1b, since the 1b-th lens subunit L1b has excessive refractive power, fluctuation of various aberrations, especially spherical and longitudinal chromatic aberrations at the telephoto end, in accordance with focus adjustment of the zoom lens, is great and difficult to be compensated even by the other lens units. Accordingly, this structure is undesirable.

When the lower and upper limits of the conditional expression (1) are respectively set at −2.0 and −0.7, more desirable advantages can be obtained.

The conditional expression (2) defines the focal length of the first lens unit L1 with respect to that of the overall zoom lens system at the telephoto end. When the focal length of the first lens unit L1 is made smaller than the lower limit of the conditional expression (2), a large magnification is advantageously achieved. Whereas, a telescopic feature is difficult to be achieved. Hence, in order to achieve a desirable focal length of the overall lens system at the telephoto end, the variable power ratio or the image-forming magnifications of the second and following lens units must be made greater, whereby the various aberrations are difficult to be appropriately compensated over the entire variable power range. Accordingly this structure is undesirable.

When the focal length of the first lens unit L1 is greater than the upper limit of the conditional expression (2), a telescopic feature is easily obtained. However, the apparent object point of the second lens unit L2 is moved away, and the moving amount of the second lens unit L2 toward the image plane for achieving a large magnification is thus increased, resulting in the greater overall length of the zoom lens. Accordingly, lying out of the upper limit is undesirable.

When the lower and upper limits of the conditional expression (2) are respectively set at 0.25 and 0.7, more desirable advantages can be obtained.

The conditional expressions (3) and (4) define the specifications of the zoom lens to which the conditional expressions (1) and (2) are effectively applied. As described above, the zoom lens according to each of the embodiments has an angle of view (2×) not greater than 2.0 degrees at its telephoto end and a variable power ratio not smaller than 5. When the values of fT/Ld and Z of the zoom lens are smaller than the respective lower limits of the conditional expressions (3) and (4), even when the zoom lens has a reduced size and weight and also a high performance, the zoom lens cannot be called that it has a satisfactorily large magnification.

Both upper limits of the conditional expressions (3) and (4) can be set at about 200 from the viewpoint of their feasibilities.

The conditional expression (5) defines the ratio of the distance from the 1a-th lens subunit L1a to the rear focal point of the first lens unit L1 to the focal length of the first lens unit L1 (hereinafter, simply referred to as the telephoto ratio of the first lens unit L1). When the telephoto ratio is greater than the upper limit of the conditional expression (5), reducing the size and weight of the zoom lens is difficult. Whereas, when the telephoto ratio is smaller than the lower limit, the 1a-th and 1b-th lens subunits L1a and L1b both have excessive optical power, and achieving the zoom lens so as to have a high performance is hence difficult. Accordingly, lying out of the upper and lower limits is undesirable.

The conditional expression (6) defines the condition for satisfactorily compensating the longitudinal chromatic aberration of the zoom lens at its telephoto end. Since the zoom lens according to each embodiment has a relatively large focal length, the zoom lens presents a problem of a longitudinal chromatic aberration on its telephoto side. When the size and weight of the zoom lens are reduced by making smaller the telephoto ratio of the first lens unit L1, the image-forming magnification β1b of the 1b-th lens subunit L1b becomes greater according to the foregoing expressions (c-1) to (c-3). Since the longitudinal chromatic aberration generating in the 1a-th lens subunit L1a is in proportion to the square of the image-forming magnification β1b of the 1b-th lens subunit L1b, the chromatic aberration in the 1a-th lens subunit L1a must be satisfactorily compensated.

Particularly, in the zoom lens having an angle of view smaller than 2.0 degrees at its telephoto end, the chromatic aberration of the zoom lens cannot be satisfactorily compensated when the 1a-th lens subunit L1a made up by a single piece of positive lens element and a single piece of negative lens element. To this end, by including at least two positive lens elements in the 1a-th lens subunit L1a and also by selecting a material having a small dispersion for the zoom lens, the longitudinal chromatic aberration at the telephoto end can be satisfactorily compensated.

Thus, in order to compensate the longitudinal chromatic aberration at the telephoto end, the conditional expression (6) defines the lower limit of a difference in the averages of the Abbe constants of the positive and negative lens elements included in the 1a-th lens subunit L1a. When the difference is smaller than the lower limit of the conditional expression (6), the longitudinal chromatic aberration generating in the 1a-th lens subunit L1a at the telephoto end is great and therefore difficult to be compensated by the other lens units. Accordingly lying out of the lower limit is undesirable. Also, not only other aberrations increase because of an increase in the number of lens elements and an increase in a curvature of each lens element included in the 1a-th lens subunit L1a for compensation of the chromatic aberration, but also the size of each lens element becomes greater for keeping its center thickness and edge thickness different. Accordingly lying out of the lower limit is undesirable. In addition, when the 1a-th lens subunit L1a is delivered toward an object upon focus adjustment, fluctuation of the longitudinal chromatic aberration in accordance with the focus adjustment is large. Accordingly lying out of the lower limit is undesirable.

The conditional expression (7) defines the condition for satisfactorily compensating the longitudinal chromatic aberration at the telephoto end and also serves as the condition for inhibiting fluctuation of the longitudinal chromatic aberration at the telephoto end in accordance with the focus adjustment when the 1b-th lens subunit L1b is moved for focus adjustment. More particularly, the conditional expression (7) defines the lower limit of a difference in the averages of the Abbe constants of the positive and negative lens elements included in the 1b-th lens subunit L1b. When the difference is smaller than the lower limit of the conditional expression (7), the longitudinal chromatic aberration generated in the 1b-th lens subunit L1b is especially great and difficult to be compensated by the other lens units. Accordingly lying out of the lower limit is undesirable. Also, not only other aberrations increase because of an increase in the number of lens elements and an increase in a curvature of each lens element included in the 1b-th lens subunit L1b for compensation of the chromatic aberration, but also the size of each lens element becomes greater for keeping its center thickness and edge thickness different. Accordingly lying out of the lower limit is undesirable. In addition, when a group of the 1b-th lens subunit L1b is delivered toward an object upon focus adjustment, fluctuation of the longitudinal chromatic aberration in accordance with the focus adjustment is large. Accordingly lying out of the lower limit is undesirable.

In the zoom lens according to each embodiment, a focal-length-transforming optical system (extender) EX may be disposed so as to be inserted into or taken out from a space S formed in the fourth lens unit L4 as shown in FIG. 1.

First Embodiment

Figure 2:
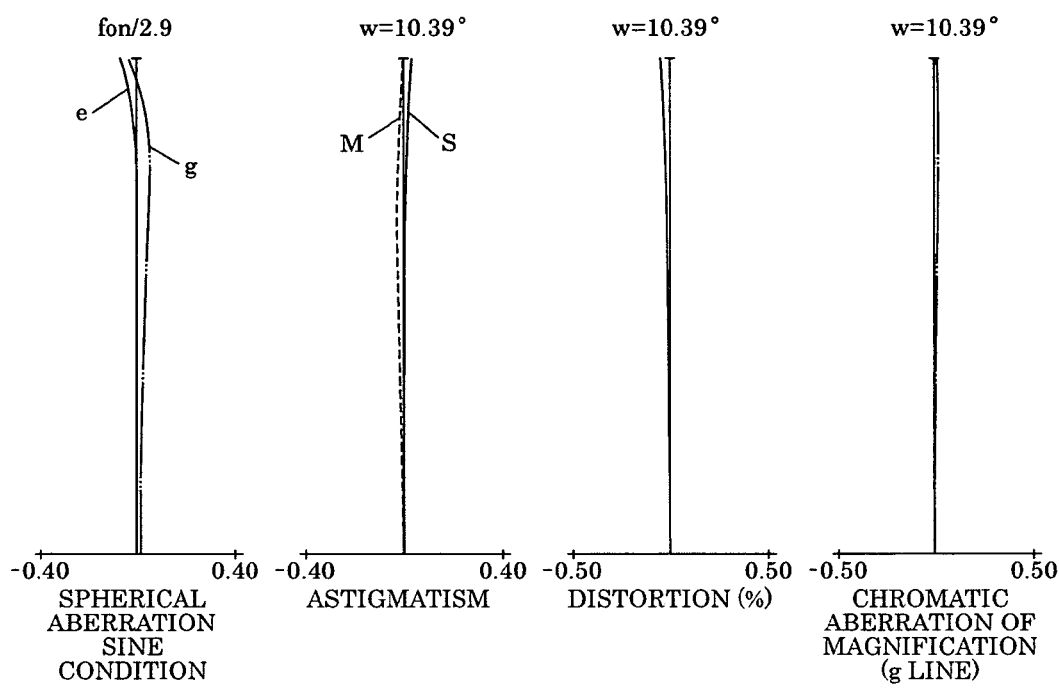
FIG. 2 illustrates aberration diagrams of the zoom lens serving as Numerical example 1 at its wide angle end.
Figure 3:
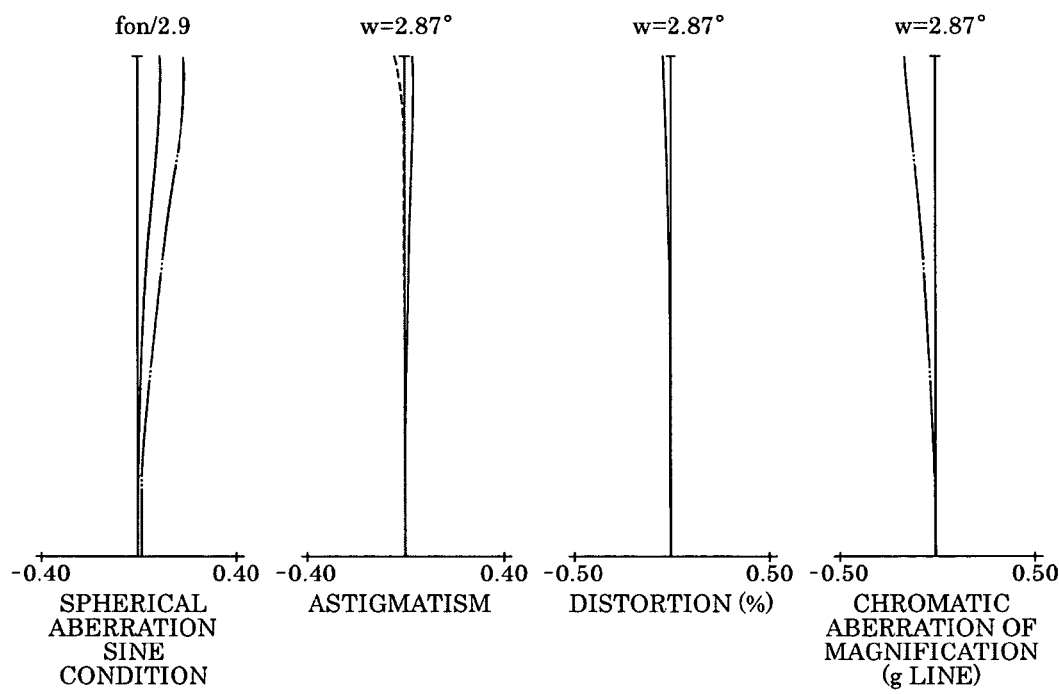
FIG. 3 illustrates aberration diagrams of the zoom lens serving as Numerical example 1 at its focal length of 284.4 mm.
Figure 4:
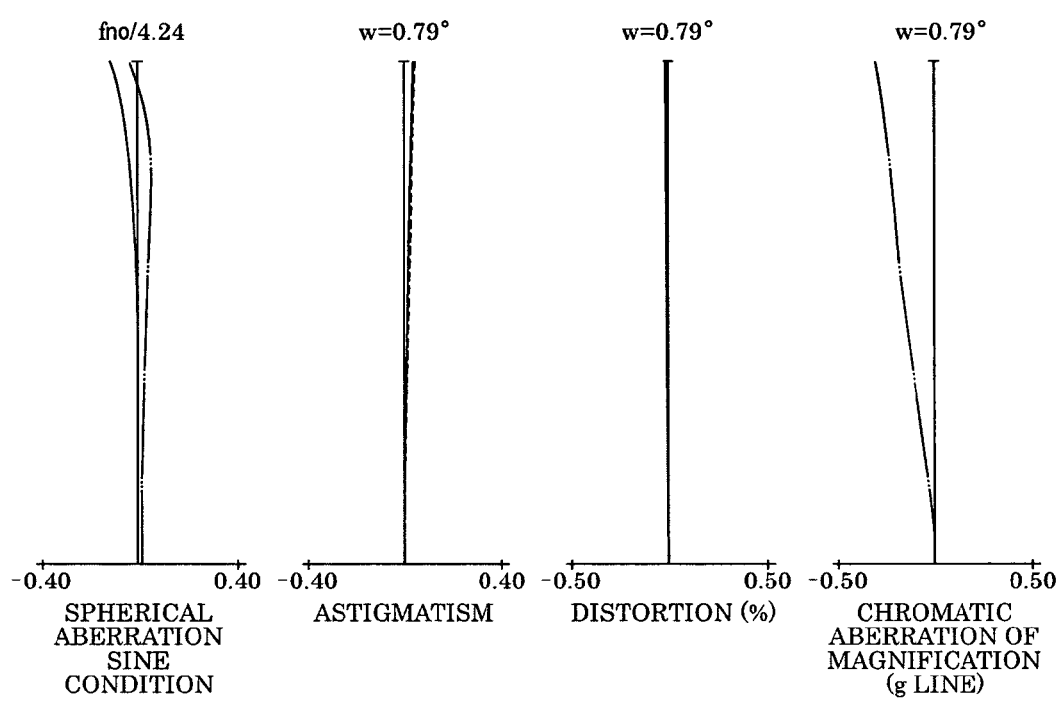
FIG. 4 illustrates aberration diagrams of the zoom lens serving as Numerical example 1 at its telephoto end.

FIG. 1 is a sectional view of a zoom lens according to a first embodiment (Numerical example 1) of the present invention at its wide angle end, while focusing at an infinite distance. FIGS. 2 to 4 illustrate aberration diagrams of the zoom lens used for Numerical example 1 at its wide angle end, middle position f=284.4 mm, and telephoto end, respectively. In each aberration diagram, notations e and g respectively represent aberrations of an e and g lines, and reference characters S and M respectively represent aberrations of sagittal and meridional image surfaces (the same is applied to the aberration diagrams of the other numerical examples).

In FIG. 1, the first lens unit L1 having a positive refractive power serves as a focus lens unit (a front cell lens unit). The second lens unit L2 having a negative refractive power for power-varying serves as a variator lens unit and performs the power-varying from its wide angle end (Wide) to telephoto end (Tele) by monotonously moving along the optical axis toward an image plane. The third lens unit L3 having a negative refractive power serves as a compensator lens unit and moves nonlinearly along the optical axis so as to draw a locus projecting towards the object in order to compensate fluctuation of an image plane in accordance with the power-varying. The variator lens unit L2 and the compensator lens unit L3 make up a power-varying system.

The fourth lens unit L4 having a positive refractive power serves as a fixed relay lens unit. The aperture SP is disposed between the compensator lens unit L3 and the relay lens unit L4, that is, between the third and fourth lens units L3 and L4. A glass block B indicates a color separation prism, an optical filter, or the like.

The focus lens unit L1 includes a positive sub-system (that is, the 1a-th lens subunit L1a) and a negative sub-system (that is, the 1b-th lens subunit) L1b in order from the object, and the positive sub-system L1a includes three pieces of positive lens elements and a single piece of negative lens element. The negative sub-system L1b is formed by bonding single pieces of positive and negative lens elements to each other.

In the zoom lens according to the present embodiment, the focal length at its telephoto end is about 402 mm; the moving amount of the variator lens unit L2 between its wide angle and telephoto ends is about 76.56 mm, and the variable power ratio is about 13.4, thereby achieving super-telescopic and high-magnification features. Since the parameters f1b/f1a and f1/fT of the zoom lens according to the present embodiment, appearing in the conditional expressions (1) and (2) respectively have the following values, the respective conditions are satisfied, thereby achieving reduction in size and weight of the zoom lens:

$$f1b/f1a = -1.7, \text{ and} \quad (1)$$

$$f1/fT = 0.44. \quad (2)$$

Since the parameters $(v_{ap} - v_{an})$ and $(v_{bn} - v_{bp})$ of the zoom lens, appearing in the conditional expressions (6) and (7) respectively have the following values, the respective conditions are satisfied, thereby satisfactorily compensating the longitudinal chromatic aberration at the telephoto end:

$$v_{ap} - v_{an} = 49.31, \text{ and} \quad (6)$$

$$v_{bn} - v_{bp} = 5.79. \quad (7)$$

In the present embodiment, the positive sub-system L1a is fixed upon focus adjustment, and the negative sub-system L1b moves along the optical axis upon the focus adjustment. In other words, the zoom lens according to the present embodiment is of a so-called inner focus type. Meanwhile, the positive sub-system L1a can alternatively perform the focal adjustment.

Although the compensator lens unit L3 compensating image-plane fluctuation has a negative refractive power in the present embodiment, it may have a positive refractive power.

Table 1 shows structural data of the zoom lens according to the present embodiment (Numerical example 1). In the table, notations f, Fno, and ω respectively represent the focal length of the overall system of the zoom lens, an F-number, and half an angle of view (denoted by w in the table). Also, notations ri and di respectively represent a curvature of radius of the surface of the i-th lens element from the object and the gap (including an air gap) between the surfaces of the i-th and the (i+1)-th lens elements. In addition, notations ni and νi (denoted by vi in the table) respectively represent a refractive index and an Abbe constant of a material forming the i-th lens element. A numerical value 0.000 of ri indicates an infinitive number. The meanings of these notations are applied in the same fashion as in each of Numerical examples (shown in Table 2 to 4), which will be described later.

TABLE 1

(Numerical example 1)
f = 30.0~402.0  Fno = 2.9~4.2  2w = 20.78°~1.57°

| r1 = 175.581 | d1 = 15.00 | n1 = 1.48915 | v1 = 70.2 |
|---|---|---|---|
| r2 = 223.192 | d2 = 0.00 | | |
| r3 = 222.192 | d3 = 3.00 | n2 = 1.73429 | V2 = 28.5 |
| r4 = 981.684 | d4 = 3.00 | | |
| r5 = 164.377 | d5 = 13.18 | n3 = 1.49845 | v3 = 81.5 |
| r6 = −1111.397 | d6 = 1.67 | | |
| r7 = 86.027 | d7 = 10.49 | n4 = 1.49845 | v4 = 81.5 |
| r8 = 207.957 | d8 = 10.75 | | |
| r9 = 229.470 | d9 = 6.07 | n5 = 1.80642 | v5 = 35.0 |
| r10 = −404.641 | d10 = 2.20 | n6 = 1.88815 | v6 = 40.8 |
| r11 = 101.356 | d11 = variable | | |
| r12 = 52.380 | d12 = 1.00 | n7 = 1.77621 | v7 = 49.6 |
| r13 = 26.219 | d13 = 3.99 | | |

TABLE 1-continued (Numerical example 1)
f = 30.0~402.0 Fno = 2.9~4.2 2w = 20.78°~1.57°

| | | | |
|---|---|---|---|
| r14 = 94.747 | d14 = 0.90 | n8 = 1.88815 | v8 = 40.8 |
| r15 = 60.941 | d15 = 1.88 | | |
| r16 = 44.759 | d16 = 4.98 | n9 = 1.81264 | v9 = 25.4 |
| r17 = −49.603 | d17 = 1.58 | | |
| r18 = 37.092 | d18 = 0.90 | n10 = 1.88815 | v10 = 40.8 |
| r19 = 563.182 | d19 = variable | | |
| r20 = −35.013 | d20 = 0.90 | n11 = 1.72056 | v11 = 47.9 |
| r21 = 22.129 | d21 = 4.73 | n12 = 1.85504 | v12 = 23.8 |
| r22 = 76.580 | d22 = variable | | |
| r23 = 0.000 (aperture) | d23 = 1.40 | | |
| r24 = 633.769 | d24 = 4.00 | n13 = 1.62286 | v13 = 60.3 |
| r25 = 59.936 | d25 = 0.15 | | |
| r26 = 39.383 | d26 = 5.85 | n14 = 1.49845 | v14 = 81.5 |
| r27 = 62.333 | d27 = 0.15 | | |
| r28 = 40.738 | d28 = 6.65 | n15 = 1.49845 | v15 = 81.5 |
| r29 = −38.644 | d29 = 1.20 | n16 = 1.88815 | v16 = 40.8 |
| r30 = 42.240 | d30 = 38.43 | | |
| r31 = 77.914 | d31 = 8.32 | n17 = 1.48915 | v17 = 70.2 |
| r32 = 47.939 | d32 = 2.88 | | |
| r33 = 39.440 | d33 = 6.00 | n18 = 1.50349 | v18 = 56.4 |
| r34 = −216.729 | d34 = 4.33 | | |
| r35 = 64.561 | d35 = 1.20 | n19 = 1.88815 | v13 = 40.8 |
| r36 = 172.861 | d36 = 9.73 | | |
| r37 = 0.000 | d37 = 33.00 | n20 = 1.61170 | v20 = 46.4 |
| r38 = 0.000 | d38 = 13.20 | n21 = 1.51872 | v21 = 64.2 |
| r39 = 0.000 | | | |

<Variable gap>

| | Focal length | | |
|---|---|---|---|
| Variable gap | 30.0 | 284.4 | 402.0 |
| d11 | 11.36 | 83.46 | 87.92 |
| d19 | 69.00 | 3.47 | 5.25 |
| d22 | 15.15 | 8.58 | 2.35 |

Second Embodiment

Figure 5:
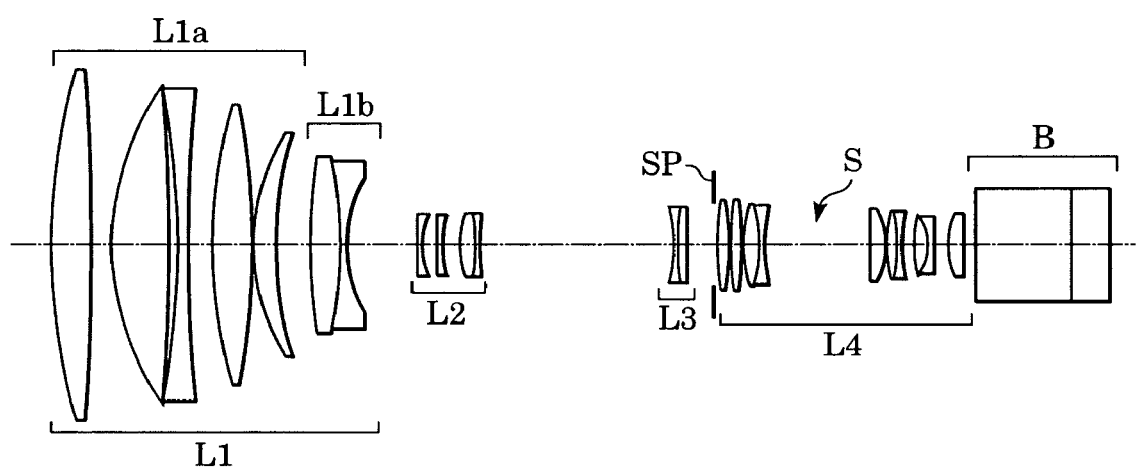
FIG. 5 is a sectional view of a zoom lens according to a second embodiment (Numerical example 2) of the present invention at its wide angle end.
Figure 6:
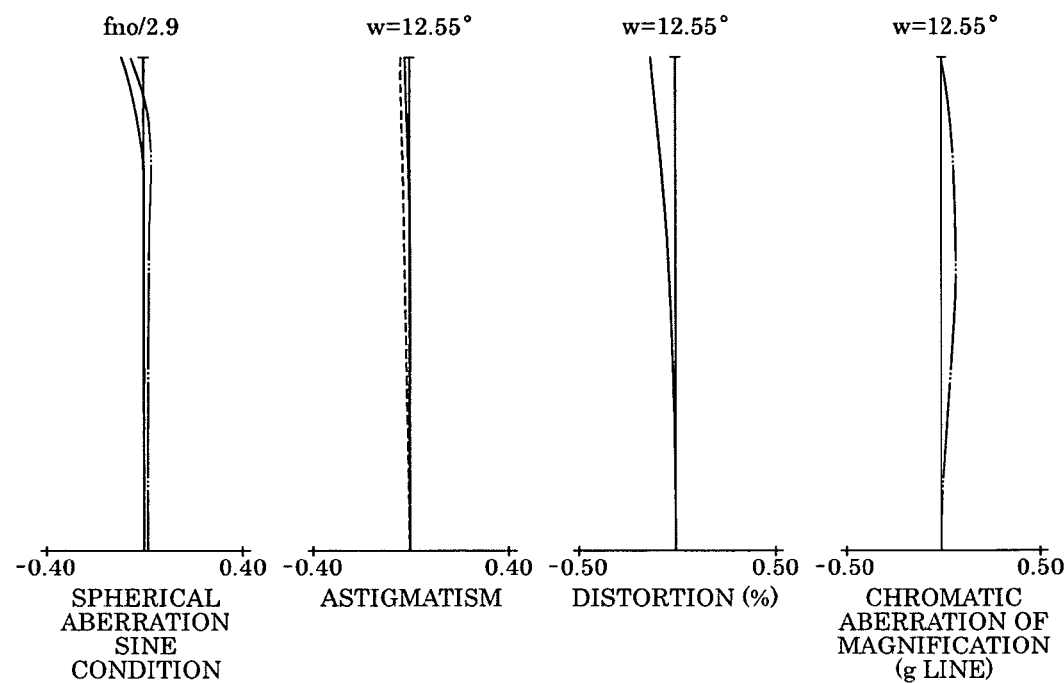
FIG. 6 illustrates aberration diagrams of the zoom lens serving as Numerical example 2 at its wide angle end.
Figure 7:
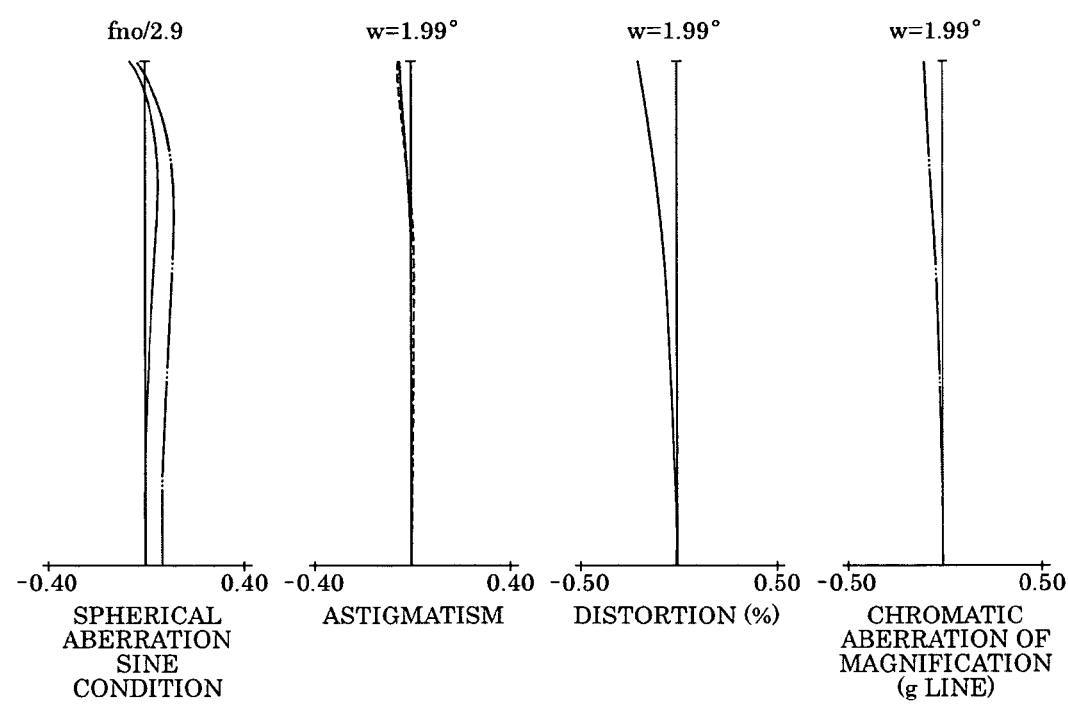
FIG. 7 illustrates aberration diagrams of the zoom lens serving as Numerical example 2 at its focal length of 158.1 mm.
Figure 8:
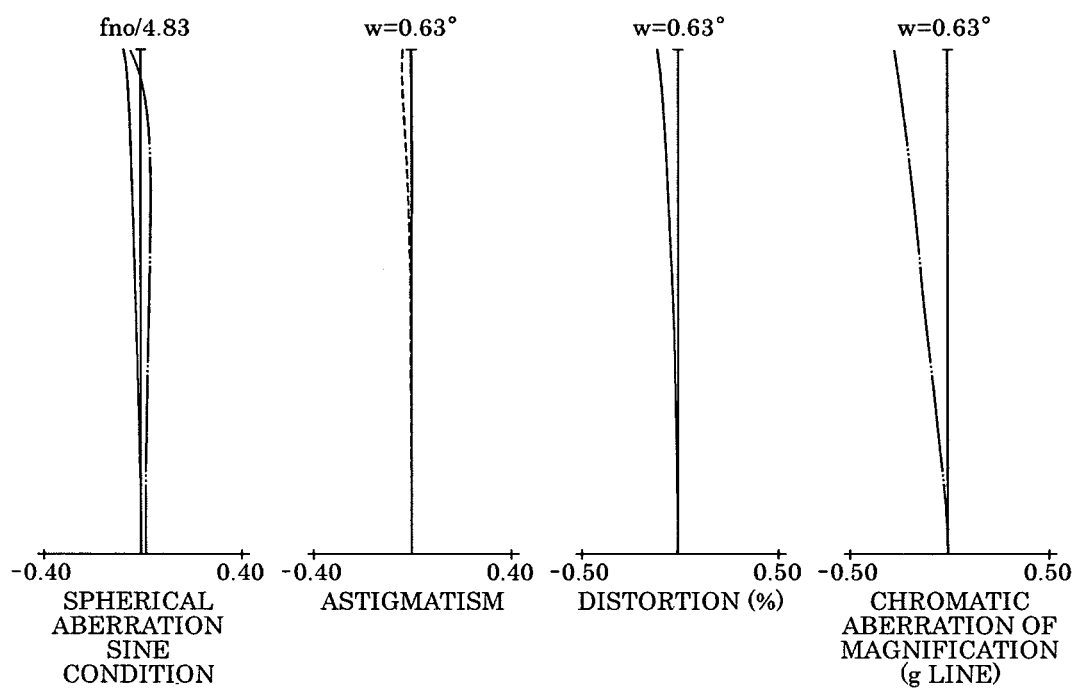
FIG. 8 illustrates aberration diagrams of the zoom lens serving as Numerical example 2 at its telephoto end.

FIG. 5 is a sectional view of a zoom lens according to a second embodiment (Numerical example 2) of the present invention at its wide angle end, while focusing at an infinite distance. FIGS. 6 to 8 illustrate aberration diagrams of the zoom lens used for Numerical example 2 at its wide angle end, middle position f=158.1 mm, and telephoto end, respectively.

In FIG. 5, the first lens unit L1 having a positive refractive power serves as a focus lens unit (a front cell lens unit). The second lens unit L2 having a negative refractive power for power-varying serves as a variator lens unit and performs the power-varying from its wide angle end (Wide) to telephoto end (Tele) by monotonously moving along the optical axis toward an image plane. The third lens unit L3 having a negative refractive power serves as a compensator lens unit and moves nonlinearly along the optical axis so as to draw a locus projecting towards the object in order to compensate fluctuation of the image plane in accordance with the power-varying. The variator lens unit L2 and the compensator lens unit L3 make up a power-varying system.

The fourth lens unit L4 having a positive refractive power serves as a fixed relay lens unit. The aperture SP is disposed between the third and fourth lens units. A glass block B indicates a color separation prism, an optical filter, or the like.

The focus lens unit L1 includes a positive sub-system (that is, the 1a-th lens subunit L1a) and a negative sub-system (that is, the 1b-th lens subunit) L1b in order from an object, and the positive sub-system L1a includes four pieces of positive lens elements and a single piece of negative lens element. The negative sub-system L1b is formed by bonding single pieces of positive and negative lens elements to each other.

In the zoom lens according to the present embodiment, the focal length at its telephoto end is about 500 mm, the moving amount of the variator lens unit L2 between its wide angle and telephoto ends is about 60.32 mm, and the variable power ratio is about 10, thereby achieving super-telescopic and high-magnification features.

Since the parameters f1b/f1a and f1/fT of the zoom lens according to the present embodiment, appearing in the conditional expressions (1) and (2) respectively have the following values, the respective conditions are satisfied, thereby achieving reduction in size and weight of the zoom lens:

$$f1b/f1a = -0.794, \text{ and} \quad (1)$$

$$f1/fT = 0.48. \quad (2)$$

Since the parameters $(v_{ap}-v_{an})$ and $(v_{bn}-v_{bp})$ of the zoom lens, appearing in the conditional expressions (6) and (7) respectively have the following values, the respective conditions are satisfied, thereby satisfactorily compensating the longitudinal chromatic aberration at the telephoto end:

$$v_a - v_{an} = 52.58, \text{ and} \quad (6)$$

$$v_{bn} - v_{bp} = 18.78. \quad (7)$$

In the present embodiment, the positive sub-system L1a is fixed upon focus adjustment, and the negative sub-system L1b moves along the optical axis upon the focus adjustment. In other words, the zoom lens according to the present embodiment is of a so-called inner focus type. Alternatively, the focus adjustment can be performed by moving the positive sub-system L1a.

Although the compensator lens unit L3 compensating fluctuation of an image plane has a negative refractive power in the present embodiment, it may have a positive refractive power.

Table 2 shows structural data of the zoom lens according to the present embodiment (Numerical example 2).

TABLE 2

(Numerical example 2)
f = 50.0~500.0 Fno = 2.9~4.83 2w = 12.55°~1.26°

| | | | |
|---|---|---|---|
| r1 = 215.395 | d1 = 13.81 | n1 = 1.48915 | v1 = 70.2 |
| r2 = 1103.089 | d2 = 7.73 | | |
| r3 = 102.446 | d3 = 19.58 | n2 = 1.43985 | v2 = 95.0 |
| r4 = 1213.593 | d4 = 3.63 | | |
| r5 = −314.023 | d5 = 3.00 | n3 = 1.72310 | v3 = 29.5 |
| r6 = 463.428 | d6 = 0.49 | | |
| r7 = 180.712 | d7 = 13.59 | n4 = 1.49845 | v4 = 81.5 |
| r8 = −341.339 | d8 = 0.51 | | |
| r9 = 69.115 | d9 = 7.49 | n5 = 1.49845 | v5 = 81.5 |
| r10 = 123.011 | d10 = 13.25 | | |
| r11 = 238.793 | d11 = 9.72 | n6 = 1.81264 | v6 = 25.4 |
| r12 = 162.447 | d12 = 2.20 | n7 = 1.79012 | v7 = 44.2 |
| r13 = 48.957 | d13 = variable | | |
| r14 = 105.707 | d14 = 1.00 | n8 = 1.77621 | v8 = 49.6 |
| r15 = 19.717 | d15 = 6.29 | | |
| r16 = 131.707 | d16 = 0.90 | n9 = 1.88815 | v9 = 40.8 |
| r17 = 38.499 | d17 = 6.83 | | |
| r18 = 42.933 | d18 = 5.46 | n10 = 1.81264 | v10 = 25.4 |
| r19 = 73.381 | d19 = 0.36 | | |
| r20 = 80.334 | d20 = 0.90 | n11 = 1.88815 | v11 = 40.8 |
| r21 = 279.304 | d21 = variable | | |
| r22 = 79.132 | d22 = 0.90 | n12 = 1.72056 | v12 = 47.9 |

TABLE 2-continued (Numerical example 2)
f = 50.0~500.0 Fno = 2.9~4.83 2w = 12.55°~1.26°

| | | | |
|---|---|---|---|
| r23 = 76.300 | d23 = 3.01 | n13 = 1.85504 | v13 = 23.8 |
| r24 = 1334.828 | d24 = variable | | |
| r25 = 0.000 (aperture) | d25 = 1.40 | | |
| r26 = 01.326 | d26 = 4.35 | n14 = 1.62386 | v14 = 60.3 |
| r27 = 81.222 | d27 = 0.15 | | |
| r28 = 67.021 | d28 = 4.40 | n15 = 1.49845 | v15 = 81.3 |
| r29 = 91.410 | d29 = 0.15 | | |
| r30 = 53.029 | d30 = 6.02 | n16 = 1.48915 | v16 = 70.2 |
| r31 = 44.718 | d31 = 1.20 | n17 = 1.88815 | v17 = 40.8 |
| r32 = 61.660 | d32 = 37.33 | | |
| r33 = 1541.305 | d33 = 5.34 | n18 = 1.48915 | v18 = 70.2 |
| r34 = 33.519 | d34 = 0.46 | | |
| r35 = −11.547 | d35 = 4.18 | n19 = 1.50349 | v19 = 56.4 |
| r36 = 81.577 | d36 = 4.20 | n20 = 1.88815 | v20 = 40.8 |
| r37 = 58.529 | d37 = 4.74 | | |
| r38 = 71.991 | d38 = 5.04 | n21 = 1.59667 | v21 = 35.3 |
| r39 = −21.536 | d39 = 1.20 | n22 = 1.88815 | v22 = 40.8 |
| r40 = 84.101 | d40 = 5.59 | | |
| r41 = 33.627 | d41 = 5.57 | n23 = 1.48915 | v23 = 70.2 |
| r42 = −86.740 | d42 = 3.80 | | |
| r43 = 0 000 | d43 = 33 00 | n24 = 1.61170 | v24 = 46.4 |
| r43 = 0.000 | d44 = 13.20 | n25 = 1.51872 | v25 = 64.2 |
| r45 = 0.000 | | | |

<Variable gap>

| | Focal length | | |
|---|---|---|---|
| Variable gap | 50.0 | 158.1 | 500.0 |
| d13 | 25.00 | 66.22 | 85.32 |
| d21 | 69.09 | 15.94 | 17.68 |
| d24 | 10.00 | 21.94 | 1.09 |

Third Embodiment

Figure 9:
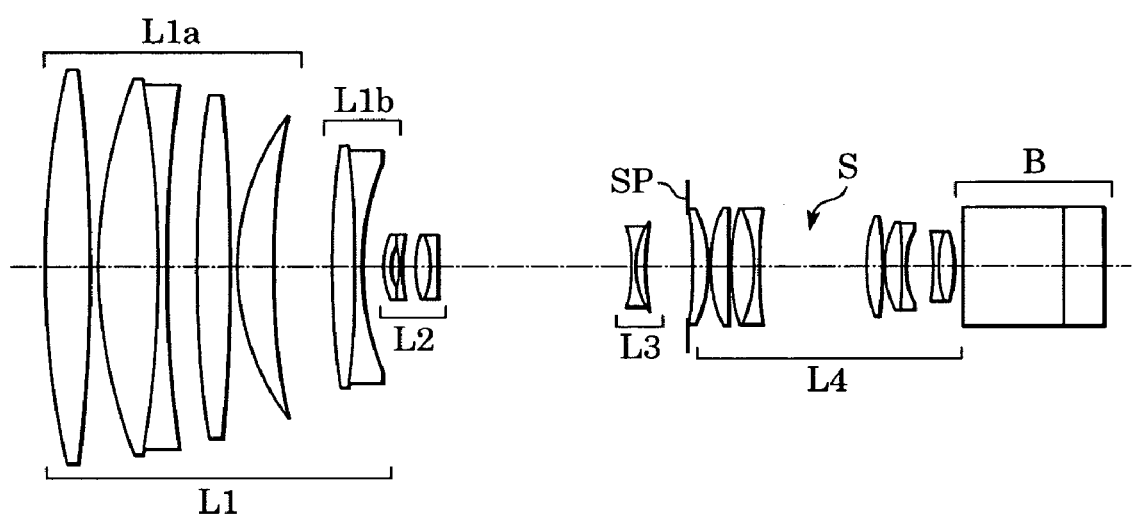
FIG. 9 is a sectional view of a zoom lens according to a third embodiment (Numerical example 3) of the present invention at its wide angle end.
Figure 10:
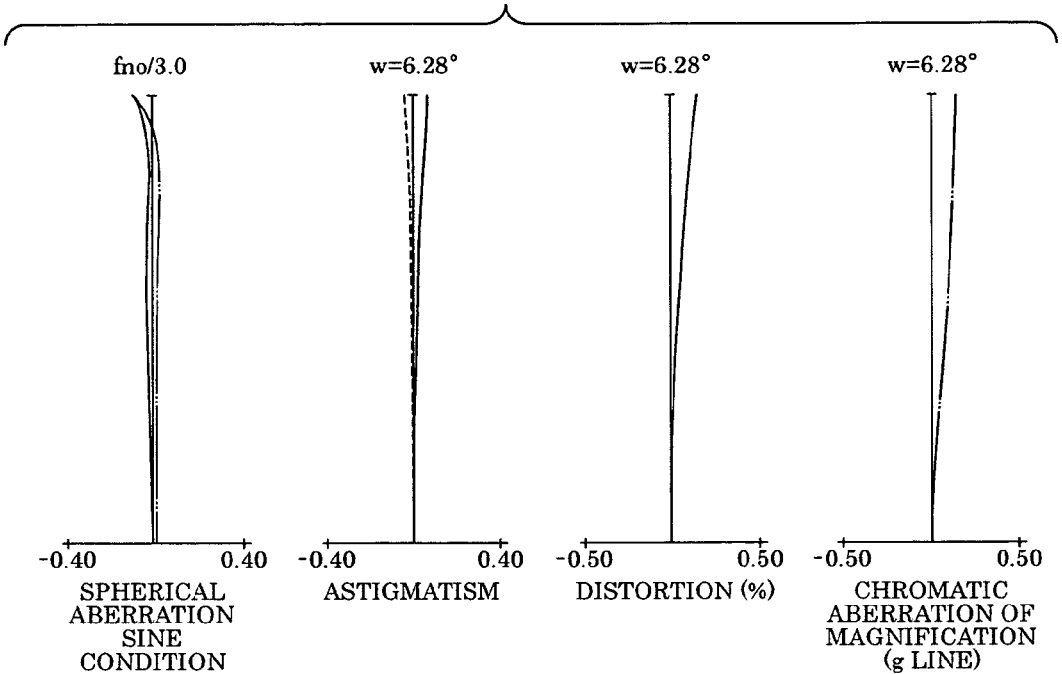
FIG. 10 illustrates aberration diagrams of the zoom lens serving as Numerical example 3 at its wide angle end.
Figure 11:
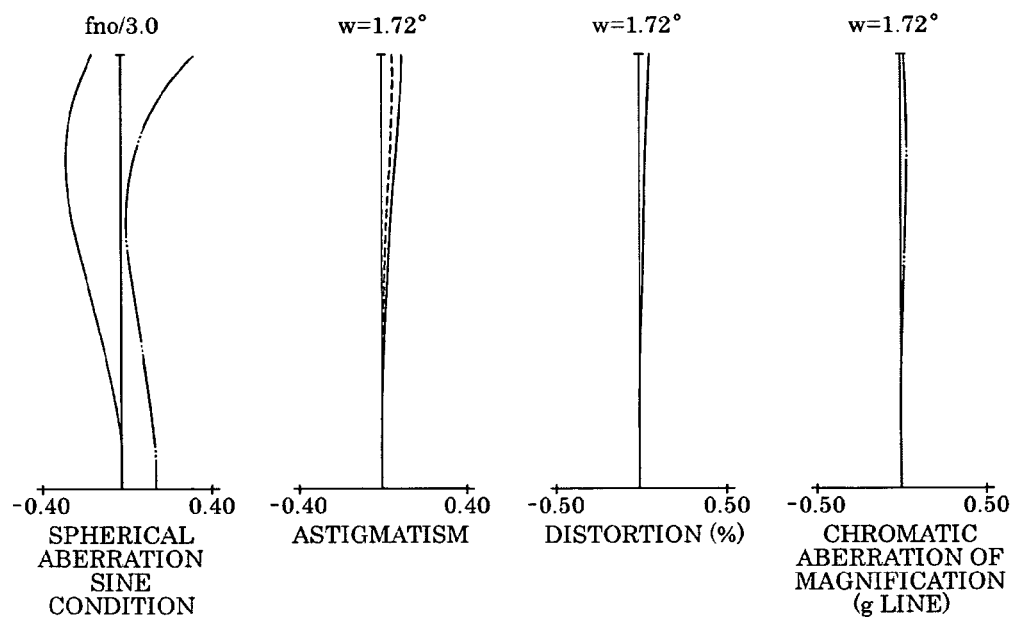
FIG. 11 illustrates aberration diagrams of the zoom lens serving as Numerical example 3 at its focal length of 183.0 mm.
Figure 12:
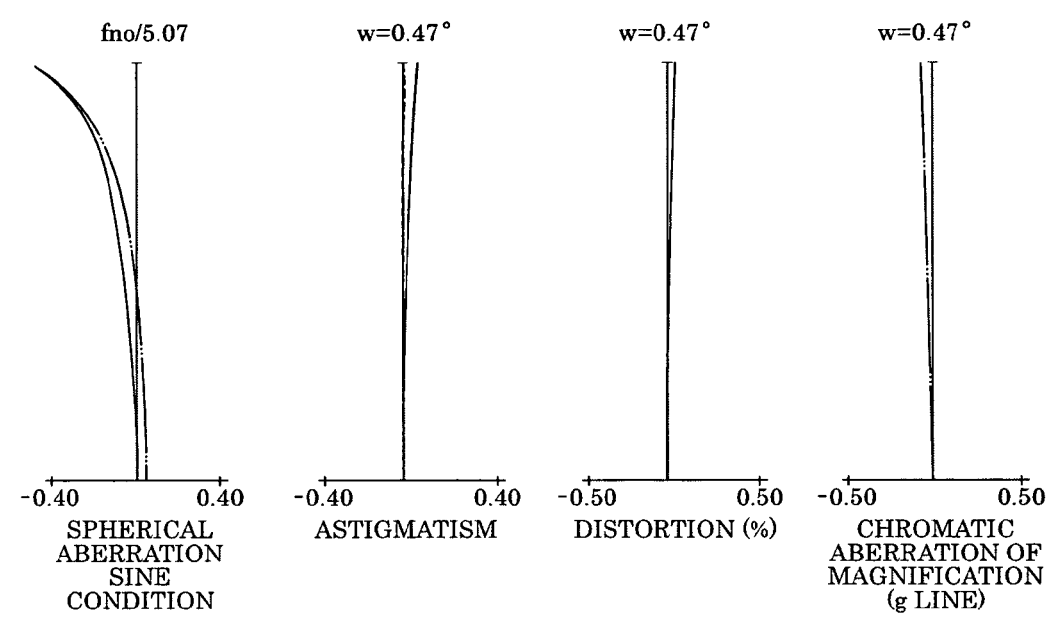
FIG. 12 illustrates aberration diagrams of the zoom lens serving as Numerical example 3 at its telephoto end.

FIG. 9 is a sectional view of a zoom lens according to a third embodiment (Numerical example 3) of the present invention at its wide angle end, while focusing at an infinite distance. FIGS. 10 to 12 illustrate aberration diagrams of the zoom lens used for Numerical example 3 at its wide angle end, middle position f=183.0 mm, and telephoto end, respectively.

In FIG. 9, the first lens unit L1 having a positive refractive power serves as a focus lens unit (a front cell lens unit). The second lens unit L2 having a negative refractive power for power-varying serves as a variator lens unit and performs the power-varying from its wide angle end (Wide) to telephoto end (Tele) by monotonously moving along the optical axis toward an image plane. The third lens unit L3 having a negative refractive power serves as a compensator lens unit and moves nonlinearly along the optical axis so as to draw a locus projecting towards the object in order to compensate fluctuation of the image plane in accordance with the power-varying. The variator lens unit L2 and the compensator lens unit L3 make up a power-varying system.

The fourth lens unit L4 having a positive refractive power serves as a fixed relay lens unit. The aperture SP is disposed between the third and fourth lens units. A glass block B indicates a color separation prism, an optical filter, or the like.

The focus lens unit L1 includes a positive sub-system (that is, the 1a-th lens subunit L1a) and a negative sub-system (that is, the 1b-th lens subunit) L1b in order from an object, and the positive sub-system L1a includes four pieces of positive lens elements and a single piece of negative lens element. The negative sub-system L1b is formed by bonding single pieces of positive and negative lens elements to each other.

In the zoom lens according to the present embodiment, the focal length at its telephoto end is about 670 mm, the moving amount of the variator lens unit L2 between its wide angle and telephoto ends is about 71.52 mm, and the variable power ratio is about 13.4, thereby achieving super-telescopic and high-magnification features.

Since the parameters f1b/f1a and f1/fT of the zoom lens according to the present embodiment, appearing in the conditional expressions (1) and (2) respectively have the following values, the respective conditions are satisfied, thereby achieving reduction in size and weight of the zoom lens:

$$f1b/f1a=-0.794, \text{ and} \qquad (1)$$

$$f1/fT=0.300. \qquad (2)$$

Since the parameters $(v_{ap}-v_{an})$ and $(v_{bn}-v_{bp})$ of the zoom lens, appearing in the conditional expressions (6) and (7) respectively have the following values, the respective conditions are satisfied, thereby satisfactorily compensating the longitudinal chromatic aberration at the telephoto end:

$$v_{ap}-v_{an}=56.44, \text{ and} \qquad (6)$$

$$v_{bn}-v_{bp}=24.18. \qquad (7)$$

In the present embodiment, the positive sub-system L1a is fixed upon focus adjustment, and the negative sub-system L1b moves along the optical axis upon the focus adjustment. In other words, the zoom lens according to the present embodiment is of a so-called inner focus type. Alternatively, the focus adjustment can be performed by moving the positive sub-system L1a.

Although the compensator lens unit L3 compensating fluctuation of an image plane has a negative refractive power in the present embodiment, it may have a positive refractive power.

Table 3 shows structural data of the zoom lens according to the present embodiment (Numerical example 3).

TABLE 3

(Numerical example 3)
f = 50.0~670.0 Fno = 3.0~5.07 2w = 12.55°~0.94°

| | | | |
|---|---|---|---|
| r1 = 313.847 | d1 = 14.86 | n1 = 1.49845 | v1 = 81.5 |
| r2 = 617.239 | d2 = 2.96 | | |
| r3 = 172.990 | d3 = 20.91 | n2 = 1.43985 | v2 = 95.0 |
| r4 = 416.954 | d4 = 0.00 | | |
| r5 = 416.954 | d5 = 3.00 | n3 = 1.73429 | v3 = 28.5 |
| r6 = 483.977 | d6 = 9.91 | | |
| r7 = 423.375 | d7 = 11.98 | n4 = 1.49845 | v4 = 81.5 |
| r8 = 600.777 | d8 = 2.17 | | |
| r9 = 84.866 | d9 = 12.68 | n5 = 1.49845 | v5 = 81.5 |
| r10 = 238.031 | d10 = 18.75 | | |
| r11 = 367.678 | d11 = 7.30 | n6 = 1.81264 | v6 = 25.4 |
| r12 = 420.866 | d12 = 2.20 | n7 = 1.77621 | v7 = 49.6 |
| r13 = 97.862 | d13 = variable | | |
| r14 = 59.128 | d14 = 1.00 | n8 = 1.77621 | v8 = 49.6 |
| r15 = 20.670 | d15 = 2.81 | | |
| r16 = 71.313 | d16 = 0.90 | n9 = 1.88815 | v9 = 40.8 |
| r17 = 67.699 | d17 = 5.06 | | |
| r18 = 40.695 | d18 = 4.87 | n10 = 1.81264 | v10 = 25.4 |
| r19 = −69.047 | d19 = 0.66 | | |
| r20 = 39.438 | d20 = 0.90 | n11 = 1.88815 | v11 = 40.8 |
| r21 = −335.918 | d21 = variable | | |
| r22 = 57.083 | d22 = 0.90 | n12 = 1.72056 | v12 = 47.9 |
| r23 = 30.020 | d23 = 3.34 | n13 = 1.85504 | v13 = 23.8 |
| r24 = 99.261 | d24 = variable | | |
| r25 = 0.000 | d25 = 1.40 | | |

TABLE 3-continued (Numerical example 3)
f = 50.0~670.0 Fno = 3.0~5.07 2w = 12.55°~0.94°

| (aperture) | | | |
|---|---|---|---|
| r26 = 177.078 | d26 = 6.00 | n14 = 1.62286 | V14 = 60.3 |
| r27 = 43.661 | d27 = 0.20 | | |
| r28 = 53.378 | d28 = 7.00 | n15 = 1.49845 | v15 = 81.5 |
| r29 = 168.123 | d29 = 0.20 | | |
| r30 = 67.898 | d30 = 8.00 | n16 = 1.48915 | v16 = 70.2 |
| r31 = 53.526 | d30 = 1.20 | n17 = 1.88815 | v17 = 40.8 |
| r32 = 165.897 | d32 = 37.34 | | |
| r33 = 47.200 | d33 = 6.00 | n18 = 1.48915 | v18 = 70.2 |
| r34 = 98.900 | d34 = 0.15 | | |
| r35 = 81.148 | d35 = 6.00 | n19 = 1.51825 | v19 = 64.1 |
| r36 = 187.764 | d36 = 1.20 | n20 = 1.81264 | v20 = 25.4 |
| r31 = 25.535 | d37 = 10.00 | | |
| r38 = 112.429 | d38 = 1.50 | n21 = 1.88815 | v21 = 40.8 |
| r39 = 35.052 | d33 = 5.15 | n22 = 1.81264 | v22 = 25.4 |
| r40 = 59.076 | d40 = 3.80 | | |
| r41 = 0.000 | d41 = 33.00 | n23 = 1.61170 | v23 = 46.4 |
| r42 = 0.000 | d42 = 13.20 | n24 = 1.51872 | v24 = 64.2 |
| r43 = 0.000 | | | |

<Variable gap>

| | Focal length | | |
|---|---|---|---|
| Variable gap | 50.0 | 183.0 | 670.0 |
| d13 | 11.36 | 60.32 | 82.88 |
| d21 | 69.00 | 15.69 | 9.88 |
| d24 | 15.15 | 19.51 | 2.76 |

Fourth Embodiment

Figure 13:
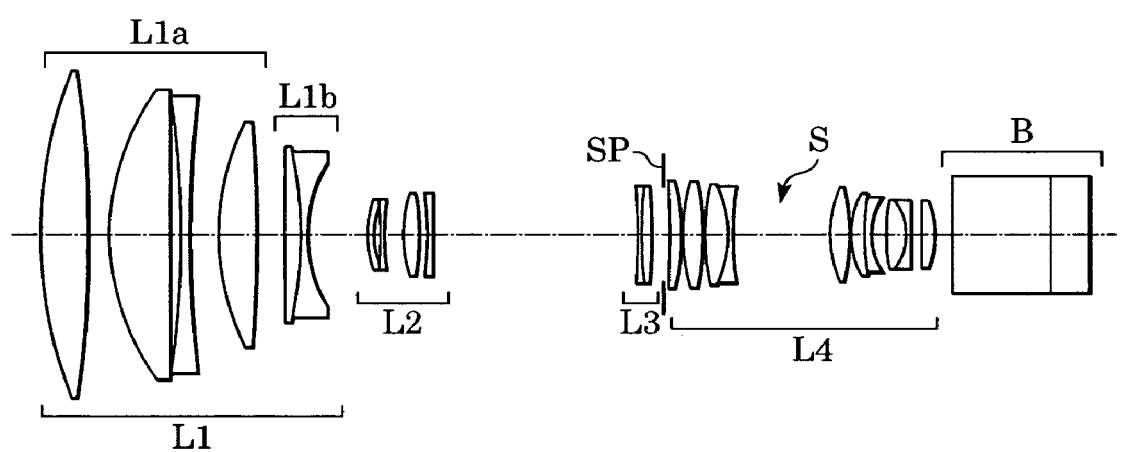
FIG. 13 is a sectional view of a zoom lens according to a fourth embodiment (Numerical example 4) of the present invention at its wide angle end.
Figure 14:
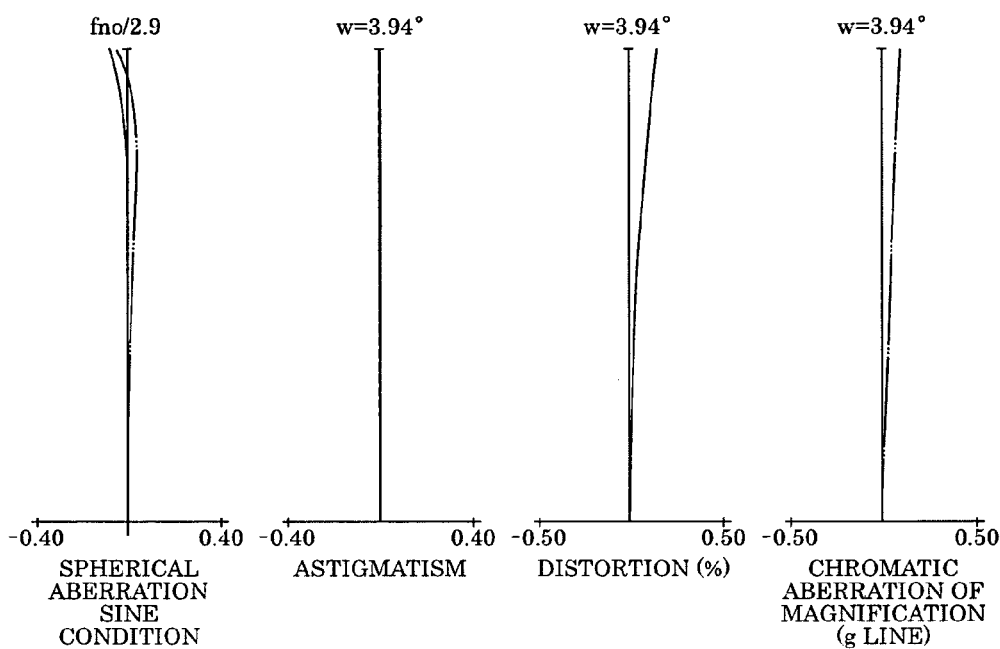
FIG. 14 illustrates aberration diagrams of the zoom lens serving as Numerical example 4 at its wide angle end.
Figure 15:
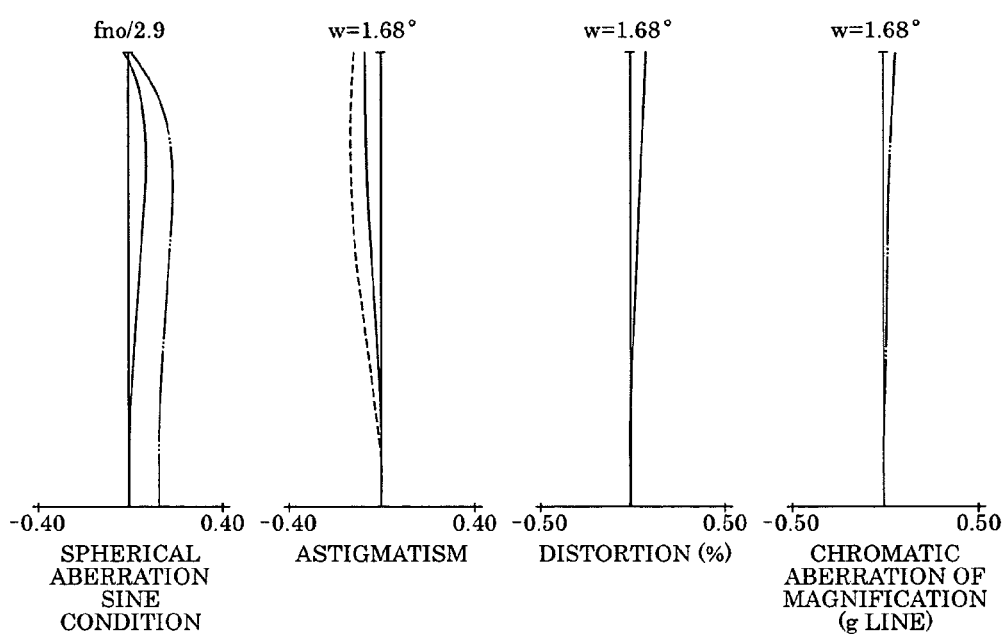
FIG. 15 illustrates aberration diagrams of the zoom lens serving as Numerical example 4 at its focal length of 187.6 mm.
Figure 16:
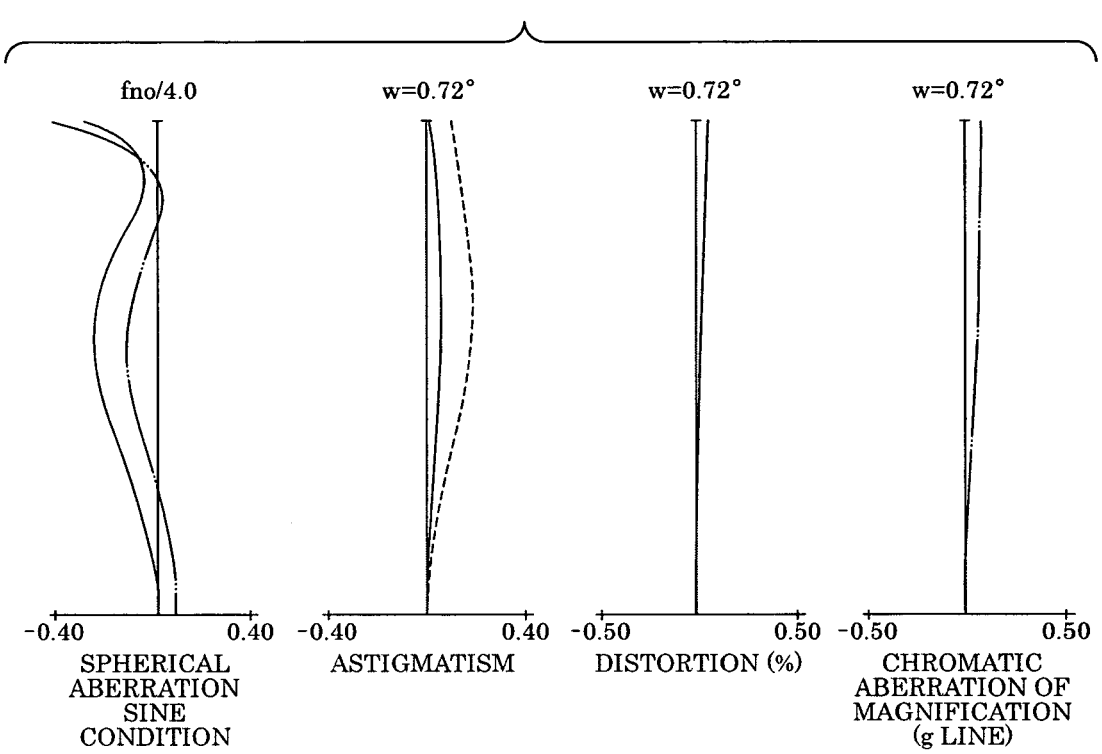
FIG. 16 illustrates aberration diagrams of the zoom lens serving as Numerical example 4 at its telephoto end.

FIG. 13 is a sectional view of a zoom lens according to a fourth embodiment (Numerical example 4) of the present invention at its wide angle end, while focusing at an infinite distance. FIGS. 14 to 16 illustrate aberration diagrams of the zoom lens used for Numerical example 4 at its wide angle end, middle position f=187.6 mm, and telephoto end, respectively.

In FIG. 13, the first lens unit L1 shown in FIG. 13 having a positive refractive power serves as a focus lens unit (a front cell lens unit). The second lens unit L2 having a negative refractive power for power-varying serves as a variator lens unit and performs the power-varying from its wide angle end (Wide) to telephoto end (Tele) by monotonously moving along the optical axis toward an image plane. The third lens unit L3 having a negative refractive power serves as a compensator lens unit and moves nonlinearly along the optical axis so as to draw a locus projecting towards the object in order to compensate fluctuation of the image plane in accordance with the power-varying. The variator lens unit L2 and the compensator lens unit L3 make up a power-varying system.

The fourth lens unit L4 having a positive refractive power serves as a fixed relay lens unit. The aperture SP is disposed between the third and fourth lens units. A glass block B indicates a color separation prism, an optical filter, or the like.

The focus lens unit L1 includes a positive sub-system (that is, the 1a-th lens subunit) L1a and a negative sub-system (that is, the 1b-th lens subunit) L1b in order from an object. The positive sub-system L1a includes three pieces of positive lens elements and a single piece of negative lens element. The negative sub-system L1b is formed by bonding single pieces of positive and negative lens elements to each other.

In the zoom lens according to the present embodiment, the focal length at its telephoto end is about 440 mm, the moving amount of the variator lens unit L2 between its wide angle and telephoto ends is about 56.08 mm, and the variable power ratio is about 5.5, thereby achieving super-telescopic and high-magnification features.

Since the parameters f1b/f1a and f1/fT of the zoom lens according to the present embodiment, appearing in the conditional expressions (1) and (2) respectively have the following values, the respective conditions are satisfied, thereby achieving reduction in size and weight of the zoom lens:

$$f1b/f1a = -0.715, \text{ and} \tag{1}$$

$$f1/fT = 0.57. \tag{2}$$

Since the parameters $(v_{ap}-v_{an})$ and $(v_{bn}-v_{bp})$ of the zoom lens, appearing in the conditional expressions (6) and (7) respectively have the following values, the respective conditions are satisfied, thereby satisfactorily compensating the longitudinal chromatic aberration at the telephoto end:

$$v_{ap}-v_{an} = 48.81, \text{ and} \tag{6}$$

$$v_{bn}-v_{bp} = 18.78. \tag{7}$$

In the present embodiment, the positive sub-system L1a is fixed upon focus adjustment, and the negative sub-system L1b moves along the optical axis upon the focus adjustment. That is, the zoom lens according to the present embodiment is of a so-called inner focus type. Alternatively, the focus adjustment can be performed by moving the positive sub-system L1a.

Although the compensator lens unit L3 compensating fluctuation of an image plane has a negative refractive power in the present embodiment, it may have a positive refractive power.

Table 4 shows structural data of the zoom lens according to the present embodiment (Numerical example 4).

TABLE 4

(Numerical example 4)
f = 80.0~440.0 Fno = 2.9~40 2w = 7.87°~1.43°

| r1 = 156.452 | d1 = 15.93 | n1 = 1.49845 | v1 = 81.5 |
|---|---|---|---|
| r2 = 453.893 | d2 = 6.01 | | |
| r3 = 85.874 | d3 = 19.34 | n2 = 1.43985 | v2 = 95.0 |
| r4 = 1252.490 | d4 = 4.58 | | |
| r5 = 352.923 | d5 = 3.00 | n3 = 1.70442 | v3 = 30.1 |
| r6 = 432.984 | d5 = 10.09 | | |
| r7 = 92.854 | d7 = 12.68 | n4 = 1.62286 | v4 = 60.3 |
| r8 = 751.917 | d8 = 9.40 | | |
| r9 = 2295.247 | d9 = 5.31 | n5 = 1.81264 | v5 = 25.4 |
| r10 = 167.173 | d10 = 2.20 | n6 = 1.79012 | v6 = 44.2 |
| r11 = 51.267 | d11 = variable | | |
| r12 = 63.199 | d12 = 1.00 | n7 = 1.77621 | v7 = 49.8 |
| r13 = 22.785 | d13 = 3.07 | | |
| r14 = −151.272 | d14 = 0.90 | n8 = 1.88815 | v8 = 40.8 |
| r15 = 49.896 | d15 = 6.52 | | |
| r16 = 45.464 | d16 = 5.50 | n9 = 1.81264 | v9 = 25.4 |
| r17 = 114.373 | d17 = 3.07 | | |
| r18 = 90.436 | d18 = 0.90 | n10 = 1.88815 | v10 = 40.8 |
| r19 = 199.070 | d19 = variable | | |
| r20 = 107.071 | d20 = 0.90 | n11 = 1.72056 | v11 = 47.9 |
| r21 = 314.850 | d21 = 2.99 | n12 = 1.85504 | v12 = 23.8 |
| r22 = 385.266 | d22 = variable | | |
| r23 = 0.000 | d23 = 1.40 | | |
| (aperture) | | | |
| r24 = 590.339 | d24 = 4.00 | n13 = 1.62286 | v13 = 60.8 |
| r25 = 89.927 | d25 = 0.15 | | |
| r26 = 68.064 | d26 = 6.88 | n14 = 1.49845 | v14 = 81.5 |
| r27 = 110.957 | d27 = 0.15 | | |
| r28 = 65.502 | d28 = 8.00 | n15 = 1.48915 | v15 = 70.2 |

TABLE 4-continued (Numerical example 4)
f = 80.0~440.0 Fno = 2.9~40 2w = 7.87°~1.43°

| | | | |
|---|---|---|---|
| r29 = 54.944 | d29 = 1.20 | n16 = 1.88815 | v16 = 40.8 |
| r30 = 128.166 | d30 = 33.00 | | |
| r31 = 46.722 | d31 = 6.56 | n17 = 1.48915 | v17 = 70.2 |
| r32 = −69.752 | d32 = 0.16 | | |
| r33 = 31.548 | d33 = 5.31 | n18 = 1.50349 | v18 = 56.4 |
| r34 = 143.101 | d34 = 1.20 | n19 = 1.88815 | v19 = 40.8 |
| r35 = 26.183 | d35 = 5.68 | | |
| r36 = 95.836 | d36 = 6.50 | n20 = 1.59667 | v20 = 35.8 |
| r37 = 22.152 | d37 = 1.20 | n21 = 1.88815 | v21 = 40.8 |
| r38 = 330.287 | d38 = 4.46 | | |
| r39 = 102.542 | d39 = 3.54 | n22 = 1.48915 | v22 = 70.2 |
| r40 = 39.812 | d40 = 5.60 | | |
| r41 = 0.000 | d41 = 33.00 | n23 = 1.61170 | v23 = 46.4 |
| r42 = 0.000 | d42 = 13.20 | n24 = 1.51872 | v24 = 64.2 |
| r43 = 0.000 | | | |

<Variable gap>

| | Focal length | | |
|---|---|---|---|
| Variable gap | 80.0 | 187.6 | 440.0 |
| d11 | 21.82 | 57.31 | 77.90 |
| d19 | 70.00 | 14.38 | 18.28 |
| d22 | 5.00 | 25.13 | 0.64 |

In the present embodiment, the zoom lens is of a so-called inner focus type in which the positive sub-system L1a is fixed upon focus adjustment, and the negative sub-system L1b moves along the optical axis upon the focus adjustment. Alternatively, the focus adjustment can be performed by moving the positive sub-system L1a. Although the compensator lens unit L3 compensating fluctuation of an image surface has a negative refractive power in the present embodiment, it may have a positive refractive power.

Table 5 shows values of the parameters appearing in the conditional expressions (1) to (7) for the respective Numerical examples 1 to 4.

TABLE 5

Values of parameters for respective Numerical examples

| | Numerical example No. | | | |
|---|---|---|---|---|
| | 1 | 2 | 3 | 4 |
| fw | 30.0 | 50.0 | 50.0 | 80.0 |
| fT | 402.0 | 500.0 | 670.0 | 440.0 |
| f1 | 181.42 | 245.29 | 204.90 | 259.67 |
| f1a | 110.77 | 102.91 | 126.76 | 89.40 |
| f1b | −188.30 | −81.73 | −180.42 | −63.89 |
| Ld | φ 11.0 | φ 11.0 | φ 11.0 | φ 11.0 |
| $v_{ap}$ | 77.77 | 82.075 | 84.90 | 78.94 |
| $v_{an}$ | 28.46 | 29.50 | 28.46 | 30.13 |
| $v_{bp}$ | 34.97 | 25.42 | 25.42 | 25.42 |
| $v_{bn}$ | 40.76 | 44.20 | 49.60 | 44.20 |
| Conditional expressions | | | | |
| (1) f1b/f1a | −1.70 | −0.79 | −1.42 | −0.72 |
| (2) f1/fT | 0.45 | 0.49 | 0.31 | 0.59 |
| (3) Z | 13.4× | 10× | 13.4× | 5.5× |
| (4) fT/Ld | 45.46 | 36.55 | 60.91 | 40.0 |
| (5) $v_{ap}-v_{an}$ | 49.31 | 52.575 | 56.44 | 48.81 |
| (6) $v_{bp}-v_{bn}$ | 5.79 | 18.78 | 24.18 | 18.78 |
| (7) K | 0.87 | 0.69 | 0.83 | 0.75 |

Table 6 shows values of parameters appearing in the foregoing expression (a-1) to (c-3) for the respective Numerical examples 1 to 4.

TABLE 6

Values of parameters

| | Numerical example No. | | | |
|---|---|---|---|---|
| | 1 | 2 | 3 | 4 |
| β2w | −0.45 | −0.36 | −0.38 | −0.44 |
| β2T | 14.01 | −4.20 | −13.82 | −2.50 |
| β3w | 0.23 | 0.51 | 0.33 | 0.66 |
| β3T | −0.10 | 0.44 | 0.12 | 0.64 |
| β4 | −1.58 | −1.11 | −1.97 | −1.06 |
| e1w | 74.01 | 155.47 | 103.78 | 161.40 |
| e1T | 150.56 | 215.79 | 175.29 | 217.48 |
| mv | 76.56 | 60.32 | 71.52 | 56.08 |
| β1b | 1.64 | 2.38 | 1.62 | 2.90 |
| e1' | 37.43 | 55.47 | 57.95 | 47.51 |

The zoom lens according to any one of the embodiments is replaceably mounted in a pickup apparatus such as a TV camera or a video camera.

Figure 19:
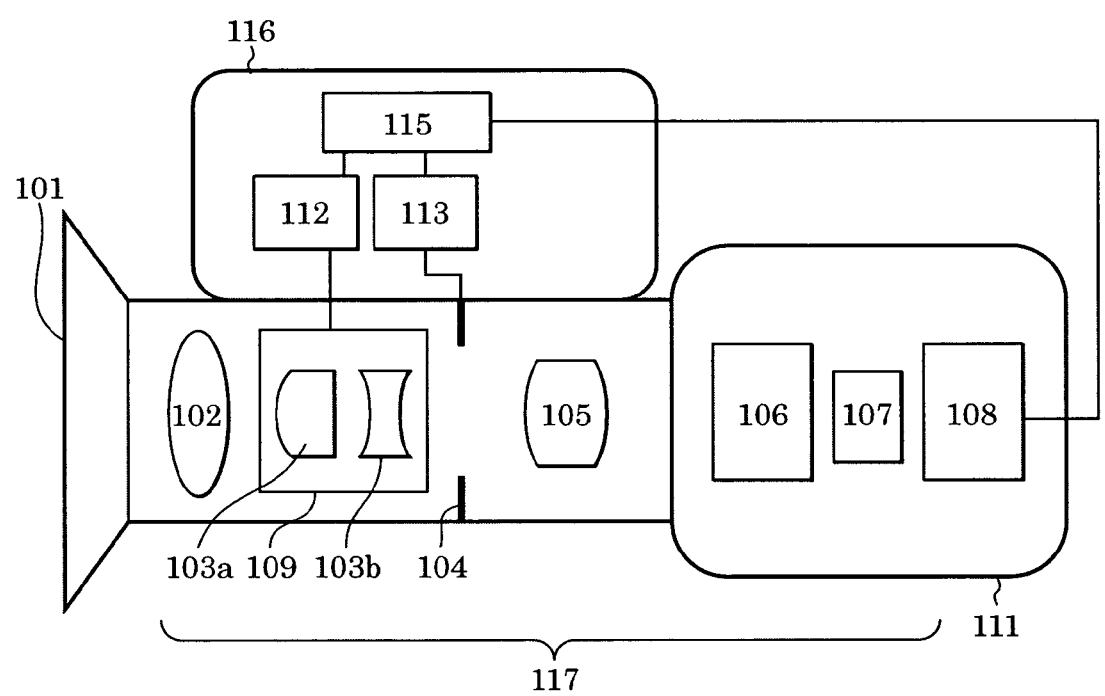
FIG. 19 is a schematic view of a pickup system having the zoom lens according to any one of the embodiments incorporated therein.

Referring now to FIG. 19, a pickup system (a TV camera system) in which the zoom lens according to any one of the embodiments is incorporated as a pickup optical system will be described.

As shown in FIG. 19, a pickup system 117 includes a zoom lens 101 (that is, the zoom lens according to any one of the embodiments) and a camera 111 serving as a pickup apparatus and is formed by mounting the zoom lens 101 in the camera 111.

The zoom lens 101 includes a front cell lens unit (a first lens unit) 102 moving along the optical axis by a manual operation so as to serve as a focus lens unit, a variator lens unit (a second lens unit) 103a moving along the optical axis for power-varying, a compensator lens unit (a third lens unit) 103b moving along the optical axis for compensating image-plane fluctuation in accordance with the power-varying, an aperture 104, and a fixed relay lens unit (a fourth lens unit) 105.

The pickup system 117 also includes a zoom-mechanism member 109 such as a cam, mechanically controlling the positions, along the optical axis, of the lens units 103a and 103b moving upon power-varying, and allowing the zoom lens to be manually operated.

The camera 111 includes a glass block 106 corresponding to an optical filter or a color separation prism, an image-pickup element (a photoelectric conversion element) 107 such as a CCD sensor or a CMOS sensor, receiving an object image formed by the zoom lens 101, and a camera controller 108 including a CPU, for controlling the camera 111.

The pickup system 117 further includes a drive unit 116 placed on the side surface of the zoom lens 101. The drive unit 116 has a variety of operational switches including a zoom switch and an aperture selector switch disposed therein and serves as an interface between the zoom lens 101 and a camera operator. The drive unit 116 includes a zoom actuator 112 driving the zoom-mechanism member 109 such that the lens units 103a and 103b are moved so as to perform power-varying, an aperture actuator 113 driving the aperture 104, and a drive unit controller 115 including a CPU, for controlling the drive unit 116.

Although the zoom lens shown in FIG. 19 is of a type in which the drive unit is externally placed, the present invention is applicable to another type of zoom lens having the function of the drive unit built therein. Also, the zoom lens may have an autofocus function mounted therein, detecting its focal point and controlling the position of the focus lens unit 102.

Although a refractive power of the lens unit or the lens element is described in the foregoing embodiments, the present invention is applicable to a case in which the lens unit or the lens element has an optical power equivalent to that in accordance with refraction of a diffractive optics, for example, bonded to a lens surface.

According to the present invention, by appropriately setting the optical power arrangement of the first and second lens subunits of the first lens unit, a compact and lightweight zoom lens having a high optical performance can be achieved even when a large magnification is provided.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-108589 filed Mar. 31, 2004, which is hereby incorporated by reference herein.

What is claimed is:

1. A zoom lens comprising:
   first, second, third and fourth lens units arranged in order from an object, respectively;
   the first lens unit being fixed during power-varying and having positive optical power;
   the second lens unit being movable during the power-varying;
   the third lens unit being movable so as to compensate image-plane fluctuation in accordance with the power-varying; and
   the fourth lens unit being fixed during the power-varying and having positive optical power,
   wherein the first lens unit includes a first lens subunit having positive optical power and a second lens subunit having negative optical power, and the first and second lens subunits are arranged in order from the object, respectively,
   wherein one of the first and second lens subunits moves upon focus adjustment, and
   wherein a focal length of the first lens unit (f1), a focal length of the first lens subunit (f1$a$), a focal length of the second lens subunit (f1$b$), and a focal length of the overall system of the zoom lens at its telephoto end (fT) satisfy the following conditions:

$-2.5 < f1b/f1a < -0.6$, and $0.2 < f1/fT < 0.8$.

2. The zoom lens according to claim 1, wherein a diagonal length of an effective picture plane formed by the zoom lens (Ld) and a zoom ratio of the zoom lens (Z) satisfy the following conditions:

$30 < fT/Ld$, and $5 < Z$.

3. The zoom lens according to claim 1, wherein a ratio (K) of a distance from the first lens subunit to a rear focal position of the first lens unit to the focal length of the first lens unit satisfies the following condition:

$0.3 < K < 0.95$.

4. The zoom lens according to claim 1, wherein the first lens subunit includes at least two positive lens elements and at least one negative lens element, and wherein averages of Abbe constants of the positive and negative lens elements of the first lens subunit ($v_{ap}$ and $v_{an}$) satisfy the following condition:

$v_{ap} - v_{an} > 30$.

5. The zoom lens according to claim 1, wherein the second lens subunit includes at least one positive lens element and at least one negative lens element, and wherein averages of Abbe constants of the positive and negative lens elements of the second lens subunit ($v_{bp}$ and $v_{bn}$) satisfy the following condition:

$v_{bn} - v_{bp} > 5$.

6. The zoom lens according to claim 1, further comprising a aperture disposed between the third and the fourth lens units.

7. The zoom lens according to claim 1, further comprising a focal-length-transforming optical system removably inserted into a space in the fourth lens unit.

8. A pickup system, comprising:
   the zoom lens according to any one of claims 1 to 7; and
   a pickup apparatus having the zoom lens mounted therein.

* * * * *